US012315671B2

(12) United States Patent
Fursa et al.

(10) Patent No.: US 12,315,671 B2
(45) Date of Patent: May 27, 2025

(54) INDUCTIVE COMPONENT AND METHOD FOR ADJUSTING AN INDUCTANCE

(71) Applicant: Philip Morris Products S.A., Neuchatel (CH)

(72) Inventors: Oleg Fursa, Gempenach (CH); Juergen Frey, Heidenheim (DE); Stefan Weber, Regensburg (DE)

(73) Assignee: Philip Morris Products S.A., Neuchatel (CH)

(*) Notice: Subject to any disclaimer, the term of this patent is extended or adjusted under 35 U.S.C. 154(b) by 796 days.

(21) Appl. No.: 17/614,447

(22) PCT Filed: May 27, 2020

(86) PCT No.: PCT/EP2020/064726
§ 371 (c)(1),
(2) Date: Nov. 26, 2021

(87) PCT Pub. No.: WO2020/239849
PCT Pub. Date: Dec. 3, 2020

(65) Prior Publication Data

US 2022/0223339 A1 Jul. 14, 2022

(30) Foreign Application Priority Data

May 29, 2019 (DE) ..................... 10 2019 114 508.2

(51) Int. Cl.
*H01F 29/10* (2006.01)
*H01F 27/28* (2006.01)

(52) U.S. Cl.
CPC ......... *H01F 29/10* (2013.01); *H01F 27/2823* (2013.01)

(58) Field of Classification Search
CPC ............................. H01F 29/10; H01F 27/2823
See application file for complete search history.

(56) References Cited

U.S. PATENT DOCUMENTS 2,457,212 A * 12/1948 Di Toro ................... H03H 7/34 174/113 AS
2,555,511 A * 6/1951 Sands ....................... H03J 3/28 336/84 R (Continued)

FOREIGN PATENT DOCUMENTS

CN 102543373 A 7/2012
DE 102014 7/1898

(Continued)

OTHER PUBLICATIONS

International Search Report issued on Aug. 28, 2020 in PCT/EP2020/064726 filed on May 27, 2020, 2 pages.

(Continued)

*Primary Examiner* — Malcolm Barnes
(74) *Attorney, Agent, or Firm* — Oblon, McClelland, Maier & Neustadt, L.L.P.

(57) ABSTRACT

An inductive component is provided, including: a winding; and a plurality of adjustment bodies configured to adjust an inductance of the inductive component, the adjustment bodies including a ferromagnetic material and surrounding at least some regions of the winding, the inductance being adjusted via a shape and/or a position and/or a number of the adjustment bodies, and a filling body including a non-magnetic material is disposed between at least two of the adjustment bodies.

13 Claims, 2 Drawing Sheets

(56) References Cited

U.S. PATENT DOCUMENTS

Figure 1:
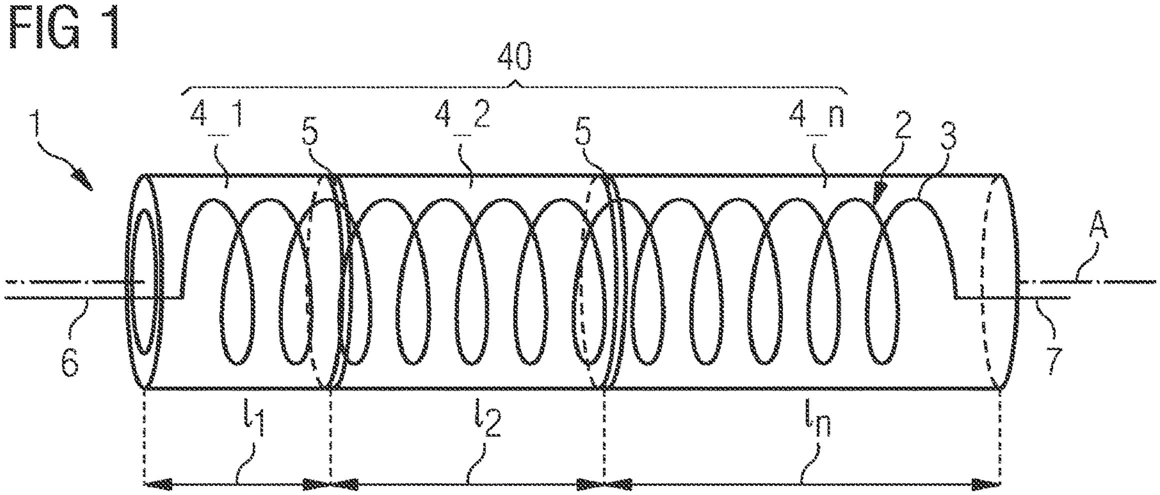

| | | | | |
|---|---|---|---|---|
| 3,173,080 A * | 3/1965 | Maeda | H03H 7/34 333/236 |
| 3,202,906 A * | 8/1965 | Maeda | H03H 7/0123 333/140 |
| 2008/0143466 A1 | 6/2008 | Monma | |
| 2010/0164497 A1* | 7/2010 | Huber | H01F 17/02 324/318 |

FOREIGN PATENT DOCUMENTS

| | | | | | |
|---|---|---|---|---|---|
| DE | 2 059 861 | | | 6/1972 | |
| DE | 36 18 122 | A1 | | 12/1987 | |
| DE | 39 26 231 | A1 | | 2/1991 | |
| DE | 199 52 192 | A1 | | 4/2001 | |
| DE | 10 2008 063 312 | A1 | | 7/2010 | |
| DE | 10 2014 003 438 | A1 | | 11/2014 | |
| EP | 0201846 | A1 | * | 11/1986 | |
| EP | 1 808 871 | A1 | | 7/2007 | |
| JP | 56-91423 | A | | 7/1981 | |
| JP | 2-63510 | A | | 3/1990 | |
| JP | 11-186049 | A | | 7/1999 | |
| JP | 2011109553 | A | * | 6/2011 | |
| SU | 266869 | A1 | | 4/1970 | |
| SU | 610192 | A1 | | 6/1978 | |
| WO | WO-2018041450 | A1 | * | 3/2018 | A24B 15/28 |

OTHER PUBLICATIONS

German Search Report (with English translation of Categories of Cited Documents) issued on Apr. 24, 2020 in German Application 10 2019 114 508.2 filed on May 29, 2019, 11 pages.

Russian Search Report issued Sep. 28, 2023 in Russian Patent Application No. 2021138981/07 (with English Translation), 4 pages.

International Preliminary Report on Patentability issued Dec. 2, 2021 in PCT/EP2020/064726 (submitting English translation only) 10 pages.

Japanese Office Action issued Jul. 23, 2024 in Japanese Patent Application No. 2021-570427 (with unedited, machine- generated English translation), 13 pages.

Office Action dated Nov. 29, 2024, issued in corresponding Chinese patent application No. 202080039164.9 (with English translation).

Notice of Allowance dated Jan. 30, 2025 issued in corresponding Japanese patent application No. 2021-570427.

Office Action dated Jan. 22, 2025, issued in corresponding Korean patent application No. 10-2021-7042427 (with English translation).

* cited by examiner

INDUCTIVE COMPONENT AND METHOD FOR ADJUSTING AN INDUCTANCE

The present invention relates to an inductive component and a method for adjusting an inductance of an inductive component. This can be a coil with a magnetic core or an air-core coil, i.e. a coil in which there is no magnetic core. The inductive component is used in a stereo system, among other things.

For many applications, a precise adjustment of the inductance value of the component, at least on a statistical average for a group of inductances (lot), is desirable. Resonance applications in particular require a highly precise adjustment of the inductance.

The exact geometric dimensions, the material properties and the operating temperature affect the inductance of electrical components. Highly precise inductance values can only be produced within certain physical limits and, on the one hand, require a material with a negligible dependence on temperature and, on the other hand, a precise control of the geometry and the material properties. The correction of deviations of the inductance value of a finished component from a desired target value is referred to as "adjustment" or "tuning".

Documents DE 36 18 122 A1, DE 39 26 231 A1, DE 199 52 192 A1 and DE 10 2008 063 312 A1 describe adjustable inductive components. An adjustment is usually accomplished by pushing a core of soft magnetic material into or out of the interior of the winding, or by pulling apart or compressing the winding.

It is an object of the present invention to provide an improved inductive component and a method for adjusting an inductance of an inductive component.

According to a first aspect of the present invention, an inductive component comprises a winding and at least one adjustment body for adjusting the inductance of the inductive component. The adjustment body comprises a ferromagnetic material and surrounds at least some regions of the winding.

In particular at least some regions of the adjustment body are disposed in a region that is further away from a winding axis of the winding than the outer side of the winding. The winding is in particular disposed at least partially within the adjustment body. Thus at least some regions of the adjustment body are disposed in an outer space of the winding. The adjustment body in particular does not extend into the interior of the winding and is therefore not configured as a magnetic core or a part of a magnetic core. The winding can also be disposed entirely within the adjustment body or only an edge region of the winding can project from the adjustment body.

For example, the length of the adjustment body is similar to that of the winding. The length of the adjustment body may be shorter or longer than the winding by a maximum of half the length of the winding. Thus, since the longitudinal ends of the adjustment body at the ends of the winding are a major influencing factor, a particularly good setting of the inductance can be achieved by moving the adjustment body out of a central position.

The magnetic field of the winding is guided through the ferromagnetic material of the adjustment body, as a result of which the inductance of the component is adjusted. The material of the adjustment body is preferably not or only slightly electrically conductive. Consequently, no current flow is induced in the adjustment body to counteract the field generated by the winding. The inductance can, for example, be maximized when the adjustment body is centered relative to the coil and reduced when it is displaced.

The adjustment body comprises a ferrite or an iron alloy, for example. The material of the adjustment body can be selected such that it is largely temperature-independent. This means that adjustment is possible independent of the temperature.

There can be only one adjustment body or there can be a plurality of such adjustment bodies. A plurality of adjustment bodies will also be referred to in the following as an adjustment arrangement. The properties described for one adjustment body can analogously also apply to the adjustment arrangement, or for individual adjustment bodies of an adjustment arrangement.

In one embodiment, the winding is disposed at least partially within the adjustment body. The adjustment body is configured as a hollow body, for example. The adjustment body can in particular be configured as a ring or sleeve.

The inductance of the component is adjusted via the shape and/or position of the adjustment body and/or the number of adjustment bodies. The inductance can in particular be fine-tuned by changing the shape, position and/or number of adjustment bodies of the component.

The inductive component can comprise a so-called air-core coil. In this case, the component does not have a magnetic core inserted into the winding. In such an embodiment, the inductance can be adjusted particularly well via external adjustment bodies. In an alternative embodiment, the inductive component can comprise a magnetic core, for example a ferrite core. In this case, the adjustment body is preferably configured separately from the ferrite core.

The winding wire is configured as a flat wire, for example. It can be a copper wire. The inductance of the component is between 1 and 1000 nH, for example. Depending on the design, the inductance can be adjusted in a range of up to 10% by varying the adjustment body.

In one embodiment, the component comprises a plurality of such adjustment bodies. The adjustment bodies form a sleeve-shaped adjustment arrangement, for example, in which the winding is disposed. The inductance can be flexibly adjusted by combining adjustment bodies having different lengths, shapes and material compositions and by varying the number of adjustment bodies.

The adjustment bodies may have different lengths. The length is defined as an extension along the winding axis of the winding. Adjustment bodies can be added or removed to adjust the inductance. If the inductance value of the component corresponds to a target value, the adjustment body can be fixed in its position.

Alternatively or additionally, the adjustment bodies can have different diameters. The diameter is defined as the extension of the adjustment body perpendicular to the winding axis. To carry out an adjustment, one adjustment body can be replaced by an adjustment body having a different diameter. It is also possible to combine adjustment bodies having different geometrical shapes. For example, adjustment bodies having circular, elliptical and rectangular outside contours can be combined.

Alternatively or additionally, the adjustment bodies can comprise different ferromagnetic materials. To carry out an adjustment, one adjustment body can be replaced by an adjustment body comprising a different material.

To adjust the inductance, it is also possible to vary the number of adjustment bodies. A filling body comprising a non-magnetic material can also be replaced by an adjustment body or vice versa. A filling body comprising a non-magnetic material can also be disposed between at least two of the adjustment bodies. The filling body comprises a plastic material, for example.

In a variety of embodiments, the adjustment body has a center point relative to the winding axis, wherein the center point is at a distance from a center point of the winding relative to the winding axis. The winding axis can also be defined as the x-axis. The center point of the adjustment body is thus at a distance from the center point of the winding in x direction.

The center points refer to the geometric center points of the winding or the adjustment body relative to the winding axis, for example. The center points can also refer to the centers of mass or the magnetic centers of the winding or the adjustment body.

A displacement of the adjustment body away from the center point of the winding leads to a reduction of the inductance, for example, and a displacement toward the center point leads to an increase of the inductance. An initial arrangement at a distance from the center point, i.e. a decentered arrangement, provides sufficient flexibility for adjusting the inductance. The spaced arrangement can in particular also be present after the fine tuning.

The adjustment body or the winding can be moved directly to shift the center point. Varying the shape, the material, or the number of adjustment bodies can also shift the center point.

In one embodiment, the inductance is adjusted via the position of the adjustment body relative to the winding axis. To carry out the adjustment, the adjustment body can be moved in both directions relative to the winding, for example, until a target value is reached. Correspondingly, it is also possible to move individual adjustment bodies of an adjustment arrangement or the entire adjustment arrangement.

The inductive component can comprise a stop for limiting the displacement of the adjustment body along a winding axis. The stop is formed by a part of a coil carrier, for example, or is attached to the coil carrier. Stops for limiting the displacement can also be provided on both sides.

The adjustment body is arranged at a distance from the stop before and/or after the displacement, for example. There is therefore room for moving the adjustment body toward the stop, so that there is flexibility for a fine tuning of the inductance. The adjustment body can also abut the stop prior to the fine tuning, and be moved away from the stop during the fine tuning.

Before and/or after the fine tuning, the adjustment body is arranged such that a displacement in one direction would lead to an increase of the inductance, for example, and a displacement in the opposite direction would lead to a reduction of the inductance. The center point of the adjustment body is at a distance from both the center point of the winding and from a stop position, for example. The stop position is the position of the center point of the adjustment body when the adjustment body abuts a stop.

For example, the distance of the center point of the adjustment body from the stop position is at least 20% of the distance between the stop position and the center point of the winding. Additionally or alternatively, the distance of the center point of the adjustment body from the center point of the winding is at least 20% of the distance between the stop position and the center point of the winding, for example.

The adjustment body or the adjustment arrangement is fixed relative to the winding, for example. After adjusting the inductance, the adjustment body is in particular secured against displacement along the winding axis. For this purpose, a bonding agent is applied, for example, before or after the adjustment. If the bonding agent is applied prior to the adjustment, a slowly curing bonding agent can be used, so that the adjustment body can be moved for the adjustment before the bonding agent cures.

The bonding agent can be an adhesive. The bonding agent attaches the adjustment body to the winding, for example, or to a coil carrier. Therefore, no further adjustment is possible after the adjustment body has been fixed. However, the component can be configured in such a way that an adjustment by moving the adjustment body along the winding axis before the bonding agent is applied is possible.

In one embodiment, the inductive component comprises a housing for shielding. This can be a metal housing. The adjustment body can be disposed between the housing and the winding. Additionally or alternatively, the adjustment body can also serve as a shield.

According to a further aspect of the present invention, a method for adjusting an inductance value of an inductive component is provided. An inductive component comprising a winding and an adjustment body is provided according to the method. The adjustment body comprises a ferromagnetic material and surrounds at least some regions of the winding. In the method, the shape and/or position and/or number of adjustment bodies is changed in order to adjust the inductance.

For instance the inductive component described above is provided, and adjusted in the course of the method. Alternatively or additionally, the method can be used to obtain the inductive component described above.

There can, for example, be a plurality of adjustment bodies as described above. The inductance can be adjusted by removing, adding or replacing an adjustment body, for example. The adjustment bodies can have different lengths, diameters and/or materials.

Prior to adjusting the inductance, for example, the inductance is measured. If there is a deviation from a target value, an adjustment is carried out using the adjustment body. After adjustment, another measurement and, if necessary, another adjustment can be carried out.

In one embodiment, the inductance is adjusted by shifting the position of the adjustment body along the winding axis. In particular the relative position of the winding and the adjustment body is important here, so that a displacement includes a direct displacement of the winding while the adjustment body is being held in place.

For instance, the adjustment body is arranged prior to the adjustment such that the inductance can be increased by displacement in one direction and the inductance can be reduced by displacement in the opposite direction. The inductance value can in particular be the highest when the adjustment body is centered relative to the winding and the inductance value can be the lowest when the arrangement is the most decentered.

The adjustment body is initially positioned at the stop position, for example, and then moved toward the center point of the winding for the adjustment. The adjustment body can also be moved beyond the center point. After the adjustment, the distance of the center point of the adjustment body from the stop position of the center point is at least 20% of the distance between the stop position and the center point of the winding, for example.

Additionally or alternatively, the distance of the center point of the adjustment body from the center point of the winding is at least 20% of the distance between the stop position and the center point of the winding, for example. These minimum distances can also be present prior to the adjustment, so that there is sufficient room for a displacement in either direction and thus for a reduction or increase of the inductance.

After the adjustment, the position of the adjustment body relative to the winding can be fixed. A bonding agent, for example, in particular an adhesive, is applied for this purpose.

The present disclosure describes several aspects of an invention. All properties that are disclosed in relation to the component or the method are also correspondingly disclosed in relation to the other aspect, even if the respective property is not explicitly mentioned in the context of the other aspects.

The description of the objects provided here is not restricted to the individual specific embodiments. Rather, the features of the individual embodiments can be combined with one another insofar as technically reasonable.

The objects described here are explained in more detail in the following on the basis of schematic design examples.

Figure 2:
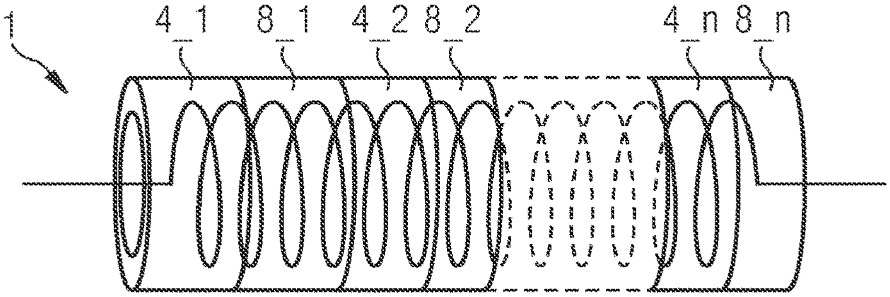
Figure 3:
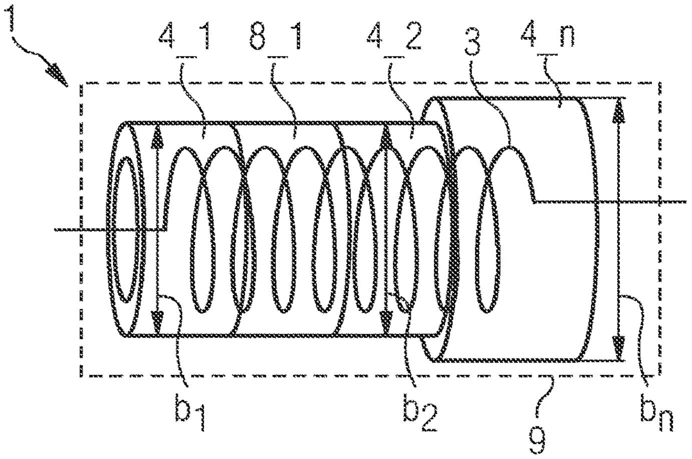
Figure 4:
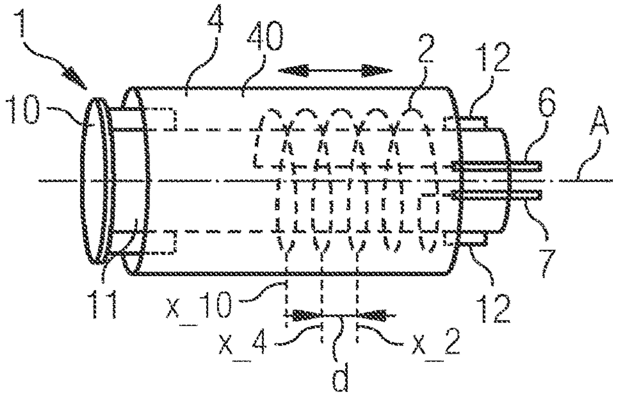
Figure 5A:
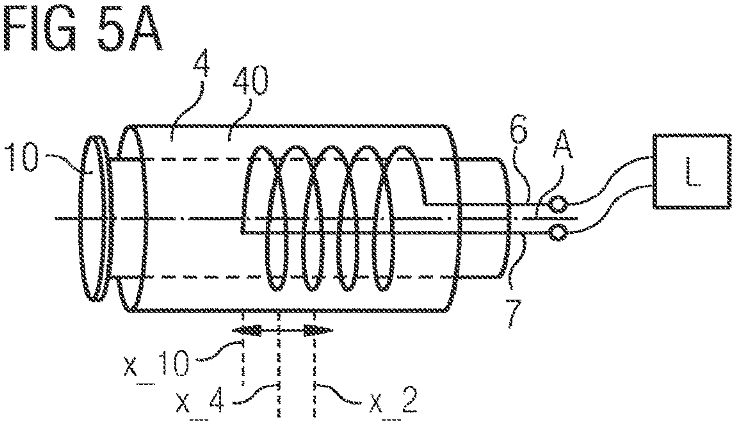
Figure 5B:
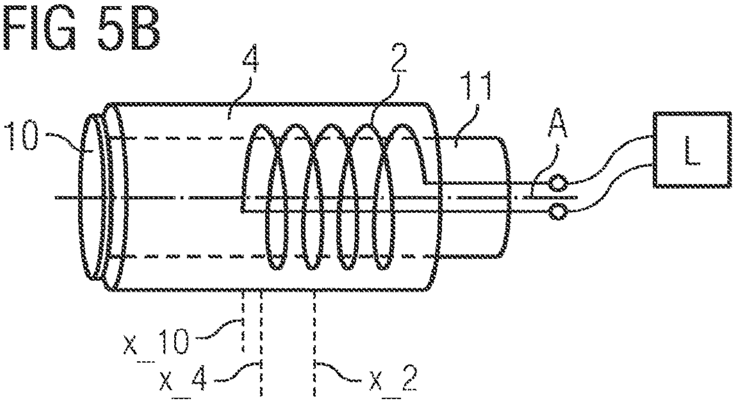
Figure 5C:
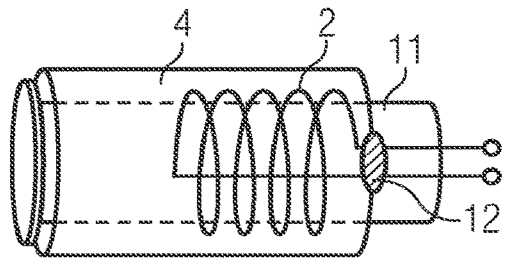

The figures show:

FIG. 1 an embodiment of an inductive component in a lateral view,

FIG. 2 a further embodiment of an inductive component in a lateral view,

FIG. 3 a further embodiment of an inductive component in a lateral view,

FIG. 4 a further embodiment of an inductive component in a lateral view,

FIGS. 5A to 5C a method for adjusting an inductance in a schematic illustration.

In the following figures, the same reference signs preferably refer to functionally or structurally equivalent parts of the various embodiments.

FIG. 1 shows an inductive component 1 comprising a winding 2. The winding 2 is formed by a helically wound wire 3.

The wire 3 is wrapped around a coil carrier 11, for example (see FIG. 4). The component 1 can be configured as a so-called air-core coil, in which there is no magnetic core in the interior of the winding 2. The coil carrier 11 is thus non-magnetic. The coil carrier 11 comprises plastic, for example, or is made of plastic. Alternatively, the coil carrier 11 is configured as a magnetic core or a magnetic core is inserted into the coil carrier 11.

The inductive component 1 comprises an adjustment arrangement 40, which is formed by a plurality of adjustment bodies 4_1, 4_2, 4_*n*. After the winding 2 has been completed, the inductance can be adjusted precisely by means of the adjustment arrangement 40. The adjustment bodies 4_1, 4_2, 4_*n* surround at least some regions of the winding 2. The adjustment bodies 4_1, 4_2, 4_*n* are in particular at least partially disposed in a region that is further away from the winding axis than the outer side of the winding 2.

The winding 2 is in particular, at least in some regions, disposed between one of the adjustment bodies 4_1, 4_2, 4_*n* and the winding axis A. "Disposed between" is defined by the winding 2 being hit by a perpendicular line which connects a point of the adjustment body 4_1, 4_2, 4_*n* to the winding axis A.

The respective adjustment bodies 4_1, 4_2, 4_*n* are formed by rings or sleeves made of ferromagnetic material. The material is ferrite, for example.

In the present case, the adjustment bodies 4_1, 4_2, 4_*n* form a hollow cylinder in which the winding 2 is disposed. The coil carrier can be disposed in the hollow cylinder as well. The wire ends 6, 7 project from the adjustment bodies 4_1, 4_2, 4_*n*. The wire ends 6, 7 are continued on, for example to connect the component 1 to a contact terminal (not shown), or provided with a further contact connection (not shown).

After the adjustment of the inductance, the adjustment bodies 4_1, 4_2, 4_*n* can be fixed relative to the winding 2. For example, the adjustment bodies 4_1, 4_2, 4_*n* are attached to the winding 2 or a coil carrier with a bonding agent, for instance an adhesive. Depending on the adjustment procedure, this can be a fast or slowly curing adhesive. For example, it is a UV adhesive.

In addition to the adjustment bodies 4_1, 4_2, 4_*n*, the component 1 can use a housing (not shown here) that at least partially surrounds the adjustment body 4_1, 4_2, 4_*n* and the winding 2. The housing can increase the adjustment range.

The housing can be a metal housing, for example. This can be a separate component, for example in the form of a metal cylinder. It can also be a wrap of metal foil, in particular an aluminum foil, which is wrapped around the adjustment bodies 4_1, 4_2, 4_*n*. It can alternatively also be a coating on the adjustment bodies 4_1, 4_2, 4_*n*. The housing preferably extends over the entire winding 2, in particular if the adjustment arrangement 40 does not extend over the entire winding 2.

In the present case, the length of the adjustment arrangement 40 is similar to that of the winding 2; the adjustment arrangement 40 is in particular slightly longer than the winding 2.

Between the adjustment bodies 4_1, 4_2, 4_*n* there can also be gaps 5. The gaps 5 can in particular be such that the position of the adjustment bodies 4_1, 4_2, 4_*n* can be changed parallel to the winding axis to adjust the inductance.

To adjust the inductance, individual adjustment bodies 4_1, 4_2, 4_*n*, in the present case rings, can be selectively added or removed. For example, after the winding 2 has been produced, the adjustment bodies 4_1, 4_2, 4_*n* are arranged around the winding 2 and the inductance of the component 1 is subsequently measured. Depending on a deviation from a target value, one or more of the adjustment bodies 4_1, 4_2, 4_*n* are removed or further adjustment bodies 4_1, 4_2, 4_*n* are added. The inductance can then be measured again and a check is carried out to see whether a target value has been reached. If necessary, further adjustment bodies 4_1, 4_2, 4_*n* are switched.

The adjustment bodies 4 can have different lengths 1_1, 1_2, 1_*n*. Depending on the size of the deviation between the target value and the measured value, a longer or shorter adjustment body 1_1, 1_2, 1_*n* is removed or added.

For example, prior to the adjustment, the inductive component 1 comprises the adjustment bodies 4_1 to 4_*n*. The adjustment body 41 is removed for the adjustment, so that the inductive component 1 comprises only the adjustment bodies 4_2 to 4_*n*. The adjustment arrangement 40 consisting of the remaining adjustment bodies 4_2 to 4_*n* is now shorter, and leads to a change in the inductance, in particular a reduction of the inductance of the component 1. In particular a change at the edge of the winding 2 leads to a change in the inductance.

The center of gravity of the adjustment arrangement 40 is also now no longer positioned centrally relative to the winding 2 in the direction of the axis, but is rather shifted to the right relative to the winding 2. This causes a change in the inductance, in particular a reduction in the inductance of the component 1.

Alternatively, or additionally, the adjustment bodies 4_1, 4_2, 4_*n* can also have different peripheral shapes. For example, the adjustment bodies 4_1, 4_2, **4_*n*** can have rectangular or elliptical peripheral shapes. Tuning can be then be carried out by changing the replacement of an adjustment body with an adjustment body having a different size.

The wire 3 of the winding 2 is configured as a flat wire, for example. It can be a copper wire.

The inductance of the component 1 is between 1 and 1000 nH, for example. Depending on the design, by varying the adjustment arrangement 40, it is possible to adjust the inductance in a range of up to 10% in steps of 0.01% of the total inductance, for example. If the subdivision of the adjustment arrangement 40 is very fine, it is possible to tune the inductance value more finely in steps of 1 nH to well below 1 nH.

The inductance can be flexibly adjusted by combining different lengths, shapes, numbers and material compositions of the adjustment bodies 4_1, 4_2, **4_*n***. Due to the large number of possible combinations, an optimal configuration in terms of AC losses, inductance, size, emission characteristics, radiation characteristics, shielding, heat development, robustness, etc. can be found, so that optimal performance can be achieved.

FIG. 2 shows a further embodiment of an inductive component 1. In contrast to FIG. 1, filling bodies 8_1, 8_2, **8_*n* are included here as well in addition to the adjustment bodies 4_1, 4_2, 4_*n*. The filling bodies 8_1, 8_2, 8_*n* are non-magnetic. The filling bodies 8_1, 8_2, 8_*n*** comprise a plastic material, for example.

The filling bodies 8_1, 8_2, **8_*n* fill the space between the adjustment bodies 4_1, 4_2, 4_*n* and serve to determine the positions of the adjustment bodies 4_1, 4_2, 4_*n*, or fill empty spaces, for example after the removal of an adjustment body to adjust the inductance. The respective filling bodies 8_1, 8_2, 8_*n* can have the same length as the adjustment bodies 4_1, 4_2, 4_*n*. The filling bodies 8_1, 8_2, 8_*n* can also have a different length than the adjustment body 4_1, 4_2, 4_*n***.

To adjust the inductance, one of the adjustment bodies 4_1, 4_2, **4_*n* is replaced by a filling body 8_1, 8_2, 8_*n*, for example, or the position of the filling bodies 8_1, 8_2, 8_*n* and the adjustment bodies 4_1, 4_2, 4_*n*** is changed.

FIG. 3 shows a further embodiment of an inductive component 1. In contrast to FIG. 2, the adjustment bodies 4_1, 4_2, **4_*n* have different diameters b1, b2**, bn. For the adjustment, one adjustment body is replaced by an adjustment body having a larger or smaller outer diameter, for example.

Here, too, one or more filling bodies 8_1 can be disposed between the adjustment bodies 4_1, 4_2, **4_*n*. In the present case, there is only one filling body 81 between two of the adjustment bodies 4_1, 4_2 and there is no filling body between the other adjustment bodies 4_2, 4_*n***. There can also be filling bodies between all or none of the adjustment bodies.

A housing 9, in which the adjustment arrangement 4 and the winding 2 are accommodated, is indicated here as well. The adjustment arrangement 4 is disposed between the housing 9 and the winding 2. The adjustment arrangement 4 can abut a wall of the housing 9. The adjustment bodies 4_1, 4_2, **4_*n* can also be attached to the housing 9. The housing 9 can also be included in the other embodiments shown. Such a housing 9**, in particular a metal housing, can improve the shielding and increase the adjustment range.

Alternatively, or additionally, the adjustment bodies 4_1, 4_2, **4_*n*** can also assume a shielding function, so that the inductances are decoupled from the environment. Such a shielding of electromagnetic waves/fields is necessary in the high-frequency range in particular. The decoupling can be optimized even further with another metal housing.

In an alternative embodiment to the air-core coil, the coil carrier can also be configured as a magnetic core, for example as a ferrite core, or there may a magnetic core in the coil carrier.

FIG. 4 shows a further embodiment of an inductive component 1. Here, too, an adjustment arrangement 40 is disposed in the outer space of the winding 2, which in this case comprises only a single adjustment body 4. The adjustment body 4 is configured as a sleeve. The winding 2 is disposed within the adjustment body 4. In the present case, the wire ends 6, 7 project out of the same end of the adjustment body 4. The wire ends 6, 7 can also project from different ends.

In the present case, the adjustment body 4 is longer than the winding 2. For example, the adjustment body 4 is longer than the winding 2 by a maximum of half the length of the winding 2.

The inductance is adjusted here by moving the adjustment body 4 along the winding axis A. The (longitudinal) position of the adjustment body 4 relative to the winding 2 is thus changed. In particular the distance d of the center point x_4 of the adjustment body 4 to the center x_2 of the winding 2 is varied. The center points x_2, x_4 refer to the geometric center points of the winding 2 or the adjustment body 4 relative to the winding axis A, for example, which can also be referred to as the x-axis. The center points x_2, x_4 can also refer to the centers of mass or the magnetic centers of the winding 2 or the adjustment body 4.

The inductive component 1 comprises a stop 10, which limits the displacement of the adjustment body 4 along the winding axis A. The stop 10 is an integral component of a coil carrier 11, for example, around which the winding 2 is disposed. The stop 10 limits the maximum displacement of the adjustment body 4 in one direction. The position of the center point of the adjustment body 4 when the adjustment body 4 abuts the stop 10 is identified as x_10.

For example, in an initial position, the center point x_4 of the adjustment body 4 is disposed halfway between the stop position x_10 and the center point x_2 of the winding 2. In this case, there is sufficient room for fine tuning in both longitudinal directions. A displacement away from the center point x_2 of the winding 2 leads to a reduction of the inductance, for example, and a displacement away from the stop position x_10 toward the center point x_2 of the winding 2 leads to an increase of the inductance.

In particular changing the position of the adjustment body 4 on the longitudinal edges of the winding 2 has a significant effect. It is therefore advantageous to move at least one longitudinal end of the adjustment body 4 in the region of a longitudinal end of the winding 2. The distance between a longitudinal end of the winding 2 and the adjustment body 4 before or after the adjustment of the inductance, for example, is at most only a few mm. In particular, the distances between the longitudinal ends of the adjustment body 4 and the respective nearest longitudinal end of winding 2 are different.

After adjusting the inductance, the adjustment body 4 is fixed in a position relative to the winding 2, for example on the coil carrier 11 or directly on the winding 2. In the end position, the adjustment body 4 is, for example, not positioned centrally, i.e. with its center point x_4 at the position of the center point x_2 of winding 2, nor at the stop position x_10, but rather is positioned between these two positions or even, viewed from the stop position x_10, beyond the center point x_2. The longitudinal ends of the adjustment body 4 then have different distances to the nearest edge-side turn of the winding 4, for example.

The coil carrier 10 can also comprise one or more spacers 12 for positioning, in particular centering, the adjustment body 4 at a fixed distance from the winding axis A. The spacers 12 are, for example, configured as radial projections of the coil carrier 10, against which an inner wall of the adjustment body 4 rests. Other elements can also be mounted on the coil carrier as spacers.

In the present case, the coil carrier 10 has a cylindrical shape. The coil former can also have a different shape, for example a cuboid shape. The coil carrier 10 can also be a part of a larger body, for example an annular body. The coil carrier 10 can be configured as a hollow body.

A combination of the properties of the embodiments of FIGS. 1 to 3 with the embodiment of FIG. 4 is possible as well. It is in particular also possible for the coil carrier 11 to be included in the embodiments of FIGS. 1 to 3, and for the wire ends 6, 7 to project from the same end. In FIGS. 1 to 3, too, the center point of the adjustment arrangement 40 on the winding axis A can be used as a measure for the position of the adjustment arrangement 40 relative to the winding 2 and, additionally or alternatively, a displacement of the adjustment arrangement 40 or the adjustment body 4_1, 4_2, **4_*n* relative to the winding 2** is possible.

FIGS. 5A to 5C show method steps for adjusting an inductance of an inductive component 1.

According to FIG. 5A, an inductive component 1 is provided, for example a component according to FIG. 4.

For example, an adjustment body 4 is disposed with its center point at position x_4 halfway between a stop position x_10 and the position x_2 of the center point of the winding 2.

The initial position of the adjustment body 4 can alternatively also be the stop position x_10, for example, and the adjustment body 4 is moved from the stop position x_10 toward the center point x_2 of the winding 2. If necessary, the adjustment body 4 can also be moved beyond the center point x_2. This has the advantage that the initial position of the adjustment body 4 can easily be adjusted.

The inductance L of the component 1 is measured. The required displacement of the adjustment body 4 along the winding axis A (x-axis) is determined as a function of a target value of the inductance L of the component 1.

According to FIG. 5B, the adjustment body 4 is then moved depending on the deviation of the measured value from the target value.

If the measured value is greater than the target value of the inductance L, for example, the adjustment body 4 is moved away from the center point x_2 of the winding 2 toward the stop position x_10. If the measured value is smaller than the target value of the inductance L, the adjustment body 4 is moved toward the center point x_2 of the winding 2. The displacement can be carried out in defined steps, for example in the μm range. The maximum displacement is in the mm range, for example. The displacement is carried out with the aid of a stepper motor, for example. The length of the displacement can also be set as a function of the deviation from the target value.

For example, depending on the geometry of the component 1, the inductance can be reduced by up to 5% by moving the adjustment body 4 from the position of the center point x_2 to the stop position x_10. If the adjustment body 4 is in the central position relative to the winding 2, a maximum inductance value can be achieved; if there is a maximum displacement to the position x_10, a minimum inductance value can be achieved.

The inductance value can then be measured again. If the inductance is sufficiently close to the target value, the position x_4 of the adjustment body 4 is fixed.

According to FIG. 5C, the adjustment body 4 is fixed in its x position. The adjustment body 4 is attached to the winding 2 or the coil carrier 11 by means of a bonding agent 13, for example. The bonding agent 13 can be an adhesive, for example, in particular a UV adhesive. The bonding agent 13 is applied and cured.

The end position x_4 can now be used for a group of components 1. Alternatively, the adjustment can also be carried out again for each individual component 1. The method is suitable for adjustment in fully automated production.

Corresponding adjustment methods can be carried out for the embodiments of FIGS. 1 to 3. In these embodiments, after measuring the inductance L in FIG. 5A, one of the adjustment bodies 4_1, 4_2, **4_*n***, for example, can be removed or added for the adjustment.

LIST OF REFERENCE SIGNS

1 Inductive component
2 Winding
3 Wire
40 Adjustment arrangement
4, 4_1, 4_2, **4_*n*** Adjustment body
5 Gap
6 Wire end
7 Wire end
8_1, 8_2, **8_*n*** Filling body
9 Housing
10 Stop
11 Coil carrier
12 Spacer
13 Bonding agent
A Winding axis
x_2 Center of winding
x_4 Center of adjustment body/adjustment arrangement
x_10 Stop position
d Distance center of winding—center of adjustment body
L Inductance
$b_1$, $b_2$, $b_n$ Diameter
$l_1$, $l_2$, Length

The invention claimed is:

1. An inductive component, comprising:

a winding; and a plurality of adjustment bodies configured to adjust an inductance of the inductive component, the adjustment bodies comprising a ferromagnetic material and surrounding at least some regions of the winding, wherein the inductance is adjusted via a shape and/or a position and/or a number of the adjustment bodies, and wherein a filling body comprising a non-magnetic material is disposed to fill a space between at least two of the adjustment bodies.

2. The inductive component according to claim 1, wherein the winding is disposed at least partially within the adjustment bodies.

3. The inductive component according to claim 1, wherein the adjustment bodies are further configured as a ring or a sleeve.

4. The inductive component according to claim 1, wherein the adjustment bodies have different lengths and/or different diameters.

5. The inductive component according to claim 1, wherein the adjustment bodies have a center point relative to a winding axis and the winding has a center point relative to the winding axis, and wherein the center point of the adjustment bodies is at a distance from the center point of the winding.

6. The inductive component according to claim 1, further comprising a stop configured to limit a displacement of the adjustment bodies along a winding axis, wherein the adjustment bodies are disposed at a distance from the stop.

7. The inductive component according to claim 1, wherein the inductance is adjusted via the position of the adjustment bodies relative to a winding axis.

8. The inductive component according to claim 1, wherein the adjustment bodies are fixed relative to the winding by means of an applied bonding agent, and wherein the adjustment bodies are further configured to be displaceable in a direction of a winding axis without the bonding agent.

9. The inductive component according to claim 1, further comprising a housing configured to provide shielding, wherein the adjustment bodies are disposed between the housing and the winding.

10. The inductive component according to claim 1, the inductive component being designed as an air-core coil.

11. The inductive component according to claim 1, wherein the filling body extends continuously between the two of the adjustment bodies.

12. The inductive component according to claim 1, wherein the filling body has a same length as at least one of the adjustment bodies.

13. The inductive component according to claim 1, wherein the filling body has a same diameter as at least one of the adjustment bodies.

* * * * *